United States Patent [19]
Chopin et al.

[11] Patent Number: 6,037,289
[45] Date of Patent: Mar. 14, 2000

[54] TITANIUM DIOXIDE-BASED PHOTOCATALYTIC COATING SUBSTRATE, AND TITANIUM DIOXIDE-BASED ORGANIC DISPERSIONS

[75] Inventors: Thierry Chopin, Saint-Leu-la-Foret; Dominique Dupuis, Deuil-la-Barre; Corinne Lehaut, Paris; Pascal Chartier, Orsay; Xavier Talpaert, Paris, all of France

[73] Assignees: Rhodia Chimie, Courbevoie; Saint-Gobain Vitrage, Aubervilliers, both of France

[21] Appl. No.: 09/043,063

[22] PCT Filed: Sep. 13, 1996

[86] PCT No.: PCT/FR96/01419

§ 371 Date: Mar. 12, 1998

§ 102(e) Date: Mar. 12, 1998

[87] PCT Pub. No.: WO97/10185

PCT Pub. Date: Mar. 20, 1997

[30] Foreign Application Priority Data

Sep. 15, 1995 [FR] France ................................. 95 10936
Sep. 15, 1995 [FR] France ................................. 95 10838

[51] Int. Cl.⁷ .......................... B01J 33/00; B01J 101/50; B05D 5/00
[52] U.S. Cl. .................. 502/2; 106/287.16; 106/287.19; 427/160; 427/168; 427/169; 502/351; 516/33
[58] Field of Search ............... 252/588; 516/33; 106/287.16, 287.19; 501/12; 427/160, 168, 169; 502/351, 2

[56] References Cited

U.S. PATENT DOCUMENTS

| | | | |
|---|---|---|---|
| 4,041,194 | 8/1977 | Jenkins | ................................. 427/226 |
| 4,112,142 | 9/1978 | Schroder et al. | .................. 427/169 X |
| 5,028,568 | 7/1991 | Anderson et al. | ......................... 501/12 |
| 5,382,383 | 1/1995 | Hirai et al. | ..................... 106/287.19 X |
| 5,854,169 | 12/1998 | Heller et al. | ................... 106/287.19 X |

FOREIGN PATENT DOCUMENTS

| | | |
|---|---|---|
| 0 544 577 | 6/1993 | European Pat. Off. . |
| 0 581 216 | 2/1994 | European Pat. Off. . |
| 2681534 | 3/1993 | France . |
| 405184921 | 7/1993 | Japan ..................................... 502/351 |

OTHER PUBLICATIONS

WPI/Derwent, AN 88–158890[23], AB of JP 63100042, May 1988.

Takahashi et al.: "Pt–$TiO_2$ Thin Films on Glass Substrates as Efficient Photocatalysts", *Journal of Materials Science* 24(1989) No. 1, pp. 243–246, Jan. 1989.

*Primary Examiner*—Richard D. Lovering
*Attorney, Agent, or Firm*—Jean-Louis Seugnet

[57] ABSTRACT

The invention relates to a substrate provided, on at least a portion of one of its faces, with a coating with a photocatalytic property based on titanium dioxide which is at least partially crystalline and which is incorporated in the said coating partly in the form of particles predominantly crystallized in the anatase form. The invention also relates to a process for the preparation of this substrate and organic dispersions of titanium dioxide particles used in the said process for the preparation of the substrate.

40 Claims, 2 Drawing Sheets

FIG_1

FIG_2

FIG_3

FIG_4

FIG_5

TITANIUM DIOXIDE-BASED PHOTOCATALYTIC COATING SUBSTRATE, AND TITANIUM DIOXIDE-BASED ORGANIC DISPERSIONS

This application is an application under 35 U.S.C. Section 371 of Internatinal Application Number PCT/FR96/01419, filed Sep. 13,1996.

The present invention relates to substrates provided with a coating possessing a photocatalytic property based on titanium dioxide, the said titanium dioxide being partly incorporated in the form of particles. It also relates to a process for the preparation of these substrates and of novel organic dispersions based on monodisperse titanium dioxide particles which can be used in this process.

It is known to functionalize materials for various applications, such as materials for vehicles or for buildings (glass, metals, ceramics, facing, cladding or roofing materials, such as tiles, and the like), by conferring on them properties such as, in particular, anti-UV, dirt-repellent, bactericidal, anti-glare, anti-static or antimicrobial properties and the like.

This is particularly true in the case of glazing, such as windscreen glazing for transportation means, where attempts have been made to functionalize them by depositing, at the surface thereof, thin layers intended to confer thereon a specific property according to the targeted application.

Thus, there exist layers with an optical function, such as so-called anti-glare layers composed of a stack of layers alternatively with high and low refractive indices. For an anti-static function or a heating function of the anti-icer type, it is also possible to provide electrically conductive thin layers, for example based on metal or doped metal oxide. For an anti-solar or low-emissivity thermal function, for example, thin layers made of metal of the silver type or based on metal oxide or nitride may be used. To obtain a "rain-repellent" effect, it is possible to provide layers with a hydrophobic nature, for example based on fluorinated organosilane, and the like.

Currently, another desired property is to obtain the permanence over time of the appearance and surface properties, which makes it possible in particular to render cleaning less frequent and/or to improve the visibility, by succeeding in removing, as they are formed, the dirty marks which are gradually deposited at the surface of the substrate, in particular dirty marks of organic origin, such as finger marks or volatile organic products present in the atmosphere, or even dirty marks of condensation type.

A solution to these problems of dirty marks consists, for example, in depositing on the substrates a coating which provides for degradation of these dirty marks by photocatalysis. Under the effect of radiation of appropriate wavelength, the components of the coating initiate radical reactions which cause oxidation of organic products.

This degradation can be induced by any compound which generates radicals under the effect of light (photocatalytic effect). It can relate in particular to titanium dioxide, which is already employed for the treatment of architectural substrates and in particular glass substrates.

Thus, it is known to use solutions of titanium compounds or colloidal titanium dioxide dispersions to create photocatalytic properties on the substrates. However, it has been found that the specific characteristics of the said solutions of titanium compounds or colloidal titanium dioxide dispersions used to treat the substrate influence the quality of the photocatalytic coating. Depending on the specific characteristics, the quality of the adhesion of the coating to the substrate can also be highly variable. Finally, it happens, in the case where the substrate is of glass, that the coating causes a lack of transparency and a fuzziness on the glass.

One aim of the present invention is thus to provide novel substrates possessing a coating based on titanium dioxide exhibiting good photocatalytic properties, the said coatings being durable, transparent and capable of being prepared industrially.

With this aim, the invention relates to a substrate provided, on at least a portion of one of its faces, with a coating with a photocatalytic property based on titanium dioxide which is at least partially crystalline and which is incorporated in the said coating partly in the form of particles predominantly crystallized in the anatase form.

The invention also relates to processes for producing this substrate, which consists in depositing the coating by liquid-phase pyrolysis or by a so-called sol-gel technique from a suspension comprising at least one organometallic compound and a dispersion of titanium dioxide particles, the said particles exhibiting the characteristics of the particles incorporated in the final coating.

Finally, the invention relates to an organic dispersion comprising:
  titanium dioxide particles with a size of between 5 and 70 nm which are monodisperse and predominantly in the anatase crystalline form,
  and at least one organic solvent, preferably exhibiting a latent heat of vaporization which is less than that of water. This dispersion is used for the preparation of the substrate according to the invention.

BRIEF DESCRIPTION OF THE DRAWINGS

Other advantages of the invention will become more clearly apparent on reading the following description, examples and figures.

The invention thus first of all relates to a substrate provided, on at least a portion of one of its faces, with a coating with a photocatalytic property based on titanium dioxide which is at least partially crystalline and which is incorporated in the said coating partly in the form of particles predominantly crystallized in the anatase form.

Taken as a whole, the titanium dioxide of the coating, in the form of particles or otherwise, is partially crystallized, in the anatase or rutile crystalline form or in the form of a mixture of anatase and of rutile, with a degree of crystallization preferably of at least 25%, in particular from approximately 30 to 80%. The degree of crystallization represents the amount by weight of crystalline $TiO_2$ with respect to the total amount by weight of $TiO_2$ in the coating.

For the titanium dioxide particles of the coating, the nature of the crystalline phase is, preferably, predominantly the anatase crystalline form. "Predominantly" means that the level of anatase in the titanium dioxide particles of the coating is greater than 50% by mass. The particles of the coating preferably exhibit a level of anatase of greater than 80%.

The degree of crystallization and the nature of the crystalline phase are measured by X-ray diffraction.

The crystalline titanium dioxide particles incorporated in the coating exhibit a mean size of between 5 and 80 nm, preferably of between 5 and 70 nm, more preferably still of between 10 and 50 nm. The diameters are measured by transmission electron microscopy (TEM).

The titanium dioxide particles are preferably incorporated in the coating using a binder.

According to a first alternative form, the binder incorporating the particles in the coating can be inorganic. It can in particular be provided in the form of an amorphous or partially crystalline oxide (or mixture of oxides), for example made of silicon, titanium, tin, zirconium or aluminium oxide. It can be confined to its role of matrix with respect to titanium dioxide particles, which is the case with silicon oxide. However, it can also participate in the photocatalytic effect of the particles by itself exhibiting a photocatalytic effect to a certain extent, even to a slight extent, with respect to that of the particles, which is the case with amorphous or partially crystalline titanium dioxide.

According to a second alternative form, the binder can also be at least partly organic, in particular in the form of a polymeric matrix. It can relate to a polymer which can exhibit properties complementary to those of the titanium dioxide particles and in particular hydrophobic and/or oleophobic properties.

Reference may be made, as example of such matrices, to Patent Application EP-A-675,087, which describes a matrix described as hybrid and obtained from a solution comprising an epoxide-containing alkoxysilane, a hydrolysable non-epoxide-containing silane, colloidal silica, a catalyst and at least one hydrolysable fluorinated alkylsilane. The fluorinated alkylsilane is of general formula:

with n from 0 to 12, m from 2 to 5 and X a hydrolysable functional group. The epoxide-containing alkylsilane is of formula:

in which p has the value 0 or 1, r has the value 0, 1 or 2, s is an integer between 1 and 6, M is a hydrogen atom or an alkyl radical comprising 1 to 4 carbon atoms and M' and M" are alkyl radicals comprising 1 to 3 carbon atoms.

The non-epoxide-containing silane is of general formula:

in which N and N' are organic groups bonded to the silicon atom via an Si—C bond and do not contain a group capable of reacting with the hydrolysed silanes present in the composition, and where Q and Q' are hydrolysable functional groups.

It is also possible to choose to superimpose, on the coating according to the invention, a grafted oleophobic and/or hydrophobic layer, for example based on the fluorinated organosilane described in Patents U.S. Pat. No. 5,368,892 and U.S. Pat. No. 5,389,427, and based on perfluoroalkyl-silane described in Patent Application EP-A-692,463, in particular of formula:

with n from 0 to 12, m from 2 to 5 and X a hydrolysable functional group.

By virtue of the titanium dioxide particles incorporated in the coating, the latter can exhibit a refractive index of between 1.40 and 2.35, preferably of between 1.6 and 2.3. This is due to the fact that the titanium dioxide particles are porous and thus exhibit a lower refractive index than bulk titanium dioxide. The coating obtained thus exhibits a low refractive index with respect to the refractive indices of the coatings based on bulk titanium dioxide.

The optical advantage related to obtaining low indices is very important in the case of glass-based substrates: a layer with a high bulk titanium dioxide index results in an increase in the light reflection of the carrier glass and thus in a decrease in its light transmission. Now, in certain applications, in particular in the field of glazing for equipping vehicles, it is essential to have high light transmission levels (for a windscreen, a minimum light transmission of 75% is necessary).

In order to amplify the photocatalytic effect of the titanium dioxide particles of the coating according to the invention, the said particles can comprise catalysts and additives, which make it possible to achieve better screening of U.V. radiation or to shift the absorption band towards the visible region, or metals which make it possible to dope the titanium dioxide in order in particular to increase the number of electron carriers. A number of alternative forms make it possible to amplify this effect.

According to a first alternative form, at least a portion of the titanium dioxide particles of the coating can comprise, in their crystal lattice, metal ions chosen from iron, copper, ruthenium, molybdenum, bismuth, tantalum, niobium, cobalt, nickel or vanadium. The ratio of the mass of these ions with respect to the mass of the titanium dioxide particles is generally between 0.01 and 10%.

According to a second alternative form, at least a portion of the titanium dioxide particles can be covered, at least partly, by a layer of metal oxides or salts, the metal being chosen from iron, copper, ruthenium, cerium, molybdenum, bismuth, tantalum, niobium, cobalt, nickel, vanadium, tungsten, tin, zirconium, cadmium or zinc. The ratio of the mass of these metals with respect to the mass of the titanium dioxide particles is generally between 0.01 and 20%.

According to a third alternative form, at least a portion of the titanium dioxide particles can be covered, at least partly, by a layer of metal chosen from platinum, silver or rhodium. The ratio of the mass of these metals with respect to the mass of the titanium dioxide particles can be between 0.01 and 5%.

According to a fourth alternative form, the coating according to the invention comprises, in addition to the titanium dioxide particles, additive particles based on metal compounds chosen from cadmium, tin, tungsten, zinc, cerium or zirconium. These particles have a colloidal size generally of between 5 and 100 nm. The ratio of the mass of these particles with respect to the mass of the titanium dioxide particles is generally between 0.01 and 20%.

These additive particles can be composed of metal oxides or sulphides, such as $CeO_2$, $SnO_2$, $WO_3$, $ZnO$, $ZrO_2$ or $CdSe_xS_y$ with x and y between 0 and 1 and x+y=1.

The thickness of the coating of the substrate according to the invention is variable. It is generally between 5 nm and 1 micron, preferably between 5 nm and 100 nm, more preferably still between 5 and 80 nm, indeed between 10 and 80 nm; it can, for example, be between 20 and 50 nm. In fact, the thickness can depend on various parameters. It can depend on the envisaged application of the substrate or alternatively on the size of the titanium dioxide particles in the coating. The coating can also be chosen with a more or less smooth surface: a degree of roughness can, in fact, be advantageous if it enables a greater photocatalytically active area to be developed. However, when exaggerated, it can be penalizing by promoting the encrusting of the dirty marks. In the case where the coating is based on titanium dioxide particles incorporated in a binder, the deposition method and coating thickness can be chosen such that the particles or the crystallites of which they are composed "emerge" at the surface of this binder.

The substrate according to the invention can be varied in nature: any type of architectural material can be used (metals, concretes, and the like), as well as glass-, ceramic- or vitroceramic-based substrates.

It is possible to deposit, between the substrate and the coating according to the invention, one or a number of other thin layers with different or complementary functions to that of the coating based on titanium dioxide. It can concern, in particular, layers with an anti-static, thermal or optical function or layers forming a barrier to the migration of certain elements originating from the substrate, for example forming a barrier to alkali metals and very particularly to sodium ions when the substrate is made of glass. It is possible to envisage a stack of alternating "anti-glare" layers of thin layers with high and low indices, the coating of the invention constituting the final layer of the stack. In this case, it is preferable for the coating to have a relatively low refractive index 10, which is the case when it is composed of an inorganic matrix of the silicon oxide type, in which titanium dioxide particles are embedded, or of a mixed oxide of titanium and of silicon.

The layer with an anti-static and/or thermal function (heating by providing it with power leads, low-emissive, anti-solar, and the like) can in particular be chosen based on a conductive material of the metal type, such as silver, or of the doped metal oxide type, such as indium oxide doped with tin ITO, tin oxide doped with a halogen of fluorine type $SnO_2$:F or zinc oxide doped with indium ZnO:In, with fluorine ZnO:F, with aluminium ZnO:Al or with tin ZnO:Sn.

Such a payer can be obtained by powder pyrolysis from dibutyltin difluoride DBTF or by liquid- or vapour-phase pyrolysis, as is described in Patent Application EP-A-648, 196. In the vapour phase, it is possible in particular to use a mixture of monobutyltin chloride and of a fluorinated precursor, optionally in combination with a "mild" oxidant of the $H_2O$ type.

The layer with an anti-static function preferably has a surface resistance value of 20 to 1000 ohms.square. Provision can be made for furnishing it with power leads in order to polarize it (feeding voltages for example of between 5 and 100 V). This controlled polarization makes it possible to control the deposition of dust with a size of the order of a millimeter capable of being deposited on the coating, in particular dry dust which adheres by an electrostatic effect: by suddenly reversing the polarization of the layer, this dust is "ejected".

The thin layer with an optical function can be chosen in order to decrease the light reflection and/or to render more neutral the colour in reflection of the substrate. In this case, it preferably exhibits a refractive index intermediate between that of the coating and that of the substrate and an appropriate optical thickness and can be composed of an oxide or of a mixture of oxides of the $Al_2O_3$, $SnO_2$, $In_2O_3$ or silicon oxycarbide or oxynitride type.

In order to obtain maximum attenuation of the colour in reflection, it is preferable for this thin layer to exhibit a refractive index close to the square root of the product of the squares of the refractive indices of the two materials which frame it, that is to say the substrate and its coating. In the same way, it is advantageous to choose its optical thickness (i.e., the product of its geometric thickness and of its refractive index) in the region of $\lambda/4$, $\lambda$ being approximately the average wavelength in the visible region, in particular from approximately 500 to 550 nm.

The coating based on titanium dioxide preferably constitutes the final layer of a stack of anti-glare layers.

The thin layer with a barrier function with respect to alkali metals can be chosen based on silicon oxide, nitride, oxynitride or oxycarbide, on aluminium oxide containing fluorine $Al_2O_3$:F or alternatively on aluminium nitride. It has proved to be useful when the substrate is made of glass, because the migration of sodium ions into the coating based on titanium dioxide can, under certain conditions, detrimentally affect the photocatalytic properties thereof.

All these optional thin layers can, in a known way, be deposited by vacuum techniques of the cathodic sputtering type or by other techniques of the thermal decomposition type, such as solid-, liquid- or gas-phase pyrolyses. Each of the abovementioned layers can combine a number of functions but it is also possible to superimpose them. Such a layer can be obtained by CVD (Chemical Vapour Deposition) from a mixture of $SiH_4$ and of ethylene diluted in nitrogen, as described in Patent Application EP-A-518, 755.

In an entirely surprising way, the substrate according to the invention in fact exhibits not one but two properties, as soon as it is exposed to appropriate radiation, such as visible light and/or ultraviolet radiation: because of the presence of photocatalytic titanium dioxide, it promotes the gradual disappearance of dirty marks of organic origin, causing them to degrade by a radical oxidation process.

The substrate according to the invention can also exhibit an external surface with a pronounced hydrophilic and/or oleophilic nature, in particular in the case where the binder is inorganic, with introduces two not insignificant advantages. First of all, the hydrophilic nature makes possible complete wetting of the coating by water: instead of a deposition of droplets in the condensation form which hampers visibility, an entirely transparent continuous thin film of water, which forms at the surface of the substrate, is in fact observed. This anti-condensation effect can be controlled by measuring a contact angle with water of less than 5° after exposure to light.

Jointly with the hydrophilic nature, the substrate according to the invention can also exhibit an oleophilic nature which makes it possible to wet organic dirty marks which, as for water, then have a tendency to be deposited on the substrate in the form of a continuous film which is less visible than highly localized "spots". An "organic dirt-repellent" effect is thus obtained which operates in two steps: as soon as it is deposited on the substrate, the dirty mark is already scarcely visible because it is spread out; and, subsequently, it gradually disappears by radical degradation initiated by photocatalysis.

The invention is particularly targeted at "dirt-repellent" and/or "anti-condensation" glazing, whether monolithic or multiple units of the double glazing or laminated type, flat or bent, which incorporates the substrates described above.

This glazing finds applications in the building industry, for example for the preparation of double glazing (it is possible to arrange the coating external side and/or internal side, i.e. on face 1 and/or on face 4). This proves to be very particularly advantageous for glazing which is not very accessible to cleaning and/or which needs to be cleaned very frequently, such as roofing glazing, airport glazing, and the like. It can also relate to vehicle windows where maintaining visibility is an essential safety criterion. This coating can thus be deposited on car windscreens, side windows or rear windows, in particular on the face of the windows turned towards the inside of the passenger compartment. This coating can then prevent the formation of condensation and/or remove traces of dirty marks of the fingermark, nicotine or organic material type, the organic material being of the volatile plasticizing type released by the plastic lining the interior of the passenger compartment, especially that of the dashboard (release sometimes known under the term "fogging").

A number of other applications are possible, in particular for glass for aquariums, shop windows, greenhouses, interior furniture or street furniture, or mirrors, television screens or electrically controlled variable absorption glazing.

Another advantageous application of the coating according to the invention consists in combining it with an electrically controlled variable absorption glazing of the following types: electrochromic glazing, liquid crystal glazing, optionally with dichroic dye, glazing containing a system of suspended particles, viologen glazing and the like. As all these glazing types are generally composed of a plurality of transparent substrates, between which are arranged the "active" elements, it is then possible advantageously to arrange the coating on the external face of at least one of these substrates.

In particular in the case of an electrochromic glazing, when the latter is in the coloured state, its absorption results in a degree of surface heating which, in fact, is capable of accelerating the photocatalytic decomposition of the carbonaceous substances which are deposited on the coating based on titanium dioxide. For further details on the structure of an electrochromic glazing, reference will advantageously be made to Patent Application EP-A-575,207, which describes an electrochromic laminated double glazing, it being possible for the coating based on titanium dioxide preferably to be positioned on face 1.

Another subject of the invention is the various processes for the preparation of the substrates described above.

According to a first method, the process for producing the substrate consists in depositing the coating, by liquid-phase pyrolysis, from a dispersion comprising at least one organometallic compound and titanium dioxide particles, the said particles exhibiting the characteristics of the particles incorporated in the final coating described above.

The technique of deposition by pyrolysis is advantageous because it makes possible the continuous deposition of the coating directly on the float glass strip, when a glass substrate is used.

According to a second method, the process for producing the substrate consists in depositing the coating by a sol-gel technique, with a method of deposition of the dip-coating, cell-coating, laminar-coating or spray-coating type, from a dispersion comprising at least one organometallic compound and titanium dioxide particles, the said particles exhibiting the characteristics of the particles incorporated in the final coating described above.

Figure 2:
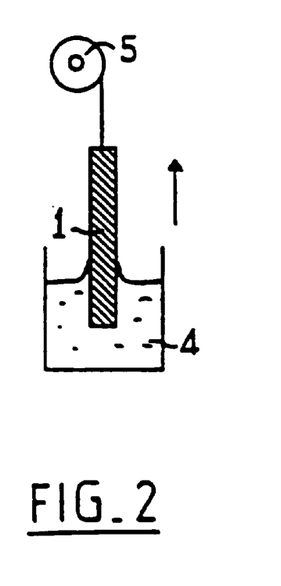
FIG. 2: diagram of a sol-gel deposition technique, by so-called dip coating of the coating.

The principle of the so-called sol-gel technique, using a method of deposition by dip coating, emerges from FIG. 2: it consists in immersing the substrate (1) in the liquid dispersion (4) containing the appropriate component(s) of the coating (3) and then in extracting the substrate (1) therefrom at a controlled rate using a motor means (5). The choice of the extraction rate makes it possible to adjust the thickness of solution remaining at the surface of both faces of the substrate and, in fact, the thickness of the coating deposited after heat treatment of the latter. This treatment is targeted simultaneously at evaporating the solvent, decomposing the organometallic compound or compounds to oxide (s), and decomposing the mechanical strength of the coating.

Figure 3:
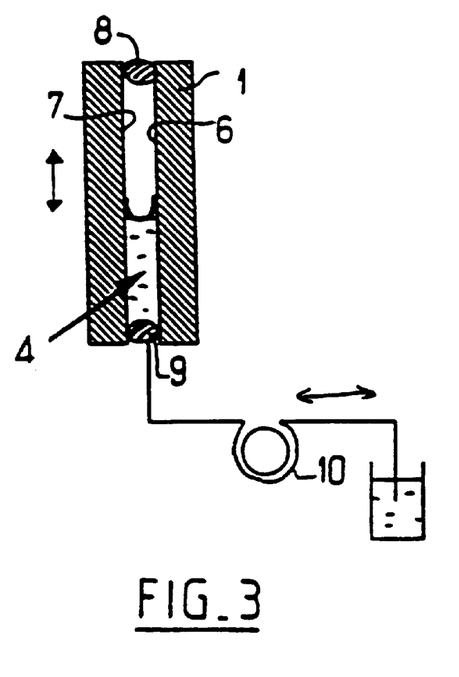
FIG. 3: diagram of a so-called cell-coating deposition technique.

The cell-coating technique emerges from FIG. 3. It consists in forming a narrow cavity delimited by two substantially parallel faces (6) and (7) and two seals (8) and (9), at least one of these faces (6), (7) being composed of the face of the substrate (1) to be treated. The cavity is filled with the dispersion comprising the organometallic compound(s) and the particles, and the solution is removed in a controlled way, so as to form a wetting meniscus, for example using a peristaltic pump (10), leaving a film of the solution on the face of the substrate (1) as the solution is removed. The cavity (5) is subsequently maintained at least for the time necessary to dry and to cure by heat treatment the film on the substrate. The advantage of this technique, in comparison with dip coating, is in particular that it is possible to treat only one of the two faces of the substrate (1) and not systematically both, unless a masking system is resorted to.

Figure 4:
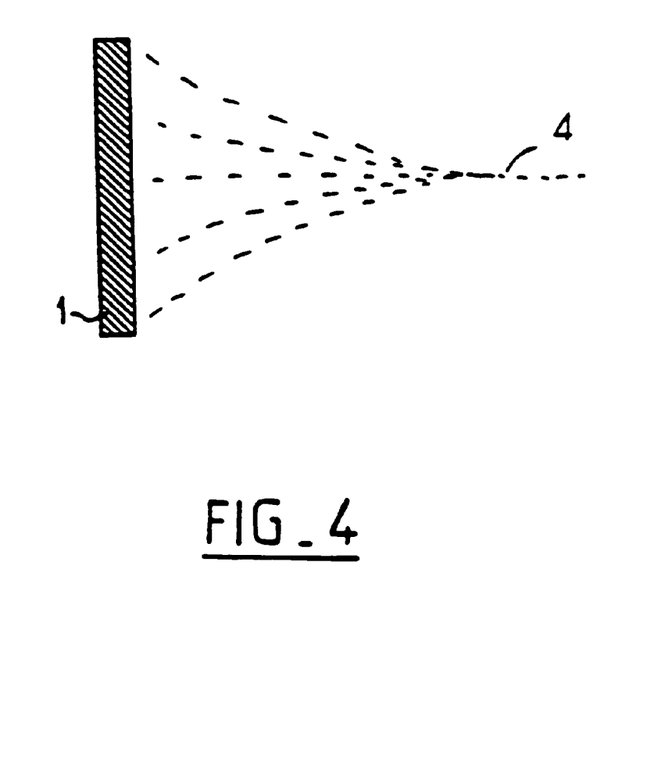
FIG. 4: diagram of a so-called spray-coating deposition technique.

The spray-coating technique is explained in detail in FIG. 4. It consists in spraying the dispersion (4) comprising the organometallic compound(s) and particles in the form of a mist against the substrate (1) under static conditions.

Figure 5:
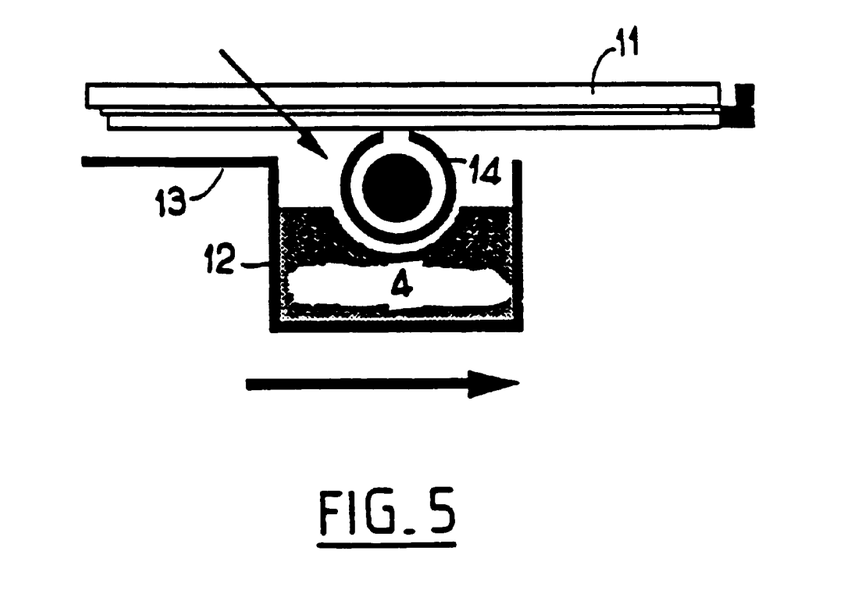
FIG. 5: diagram of a deposition technique by laminar coating.

The laminar-coating technique is illustrated in FIG. 5. It consists in passing the substrate (1), held by vacuum suction against a support (11) made of stainless steel and Teflon, over a tank (12) containing the dispersion comprising organometallic compound(s) and the particles, in which solution is partially immersed a slotted cylinder (14). The combination of the tank (12) and of the cylinder (14) is subsequently moved along the entire length of the substrate (1), the mask (13) preventing excessively rapid evaporation of the solvent from the solution (4). For more details on this technique, reference may be made to the teaching of Patent Application WO 94/01598.

According to this second method, the organometallic compounds) is decomposed thermally after coating the substrate with the solution on one or both of these faces.

The two methods described above have used a dispersion based on organometallic compounds) and on titanium dioxide particles already formed and crystallized.

The organometallic compounds are compounds in which the metal atom M can be chosen from titanium, silicon, tin, zirconium, aluminium, and the like.

It can concern organometallic compounds of general formula M(OR)$_4$ in which M represents the metal chosen from, for example, titanium, silicon, tin, zirconium or aluminium and R an alkyl, cycloalkyl, aryl, alkylaryl or arylalkyl, alkenyl or alkynyl radical, an acetylacetonate radical or one of its derivatives (methyl acetoacetate, ethyl acetoacetate, titanium acetylacetonate, and the like), an amino radical or one of its derivatives (titanium triethanolamine, titanium diethanolamine, and the like), a glycolate (titanium tetraoctylene glycolate), and the like.

Compounds of the titanate or silicate type are preferred.

The organometallic compound tetraisopropoxytitanium is suitable in particular as organometallic compound. The preferred organometallic titanium compounds are of the titanium chelate and/or titanium alkoxide type; they can be of the type of those described in Patent Applications FR-A-

2,310,977 and EP-A-465,309. Thus, the organometallic titanium compounds can be chosen from the compounds of formula $R_nTi(OR')_p$ with:

p between 1 and 4, n=4−p,

R a $C_1$ to $C_{18}$ alkyl radical,

R' a $C_1$–$C_4$ alkyl radical of the methyl, ethyl or isobutyl type.

The preferred organometallic silicon compounds can be chosen from the compounds of formula $R_nSi(OR')_p$ with:

p between 1 and 4, n=4−p,

R a $C_1$ to $C_{18}$ alkyl radical,

R' a $C_1$–$C_4$ alkyl radical of the methyl, ethyl or isobutyl type.

The preferred compounds are tetramethyl orthosilicate (TMOS), tetraethyl orthosilicate (TEOS) and $(CH_3)_2Si(OC_2H_5)_2$.

It is, of course, possible to employ mixtures of these compounds.

The particles exhibit, themselves, the characteristics mentioned above as regards size, degree of crystallinity and optionally doping by metal compounds.

The dispersion generally comprises 5 to 90% by weight of organometallic compounds, expressed as metal oxides ($MO_x$), with respect to the weight of $TiO_2$ contributed by the particles and of organometallic compounds, expressed as metal oxides ($MO_x$), preferably 15 to 80%, more preferably still from 20 to 75%.

After deposition and heat treatment, the coating can contain both titanium dioxide originating from the decomposition of the organometallic compounds, if they are based on titanium, and from the titanium dioxide particles of the dispersion, the first acting, as it were, as inorganic binder with respect to the second.

The particles are highly reactive at the photocatalytic level and can, in addition, promote the crystallization of the titanium dioxide formed by thermal decomposition from the titanium-based organometallic compounds, probably by acting as crystallization seeds. In the final coating, titanium dioxide of two different origins is thus present.

It is preferable to use monodisperse titanium dioxide particles in order to obtain transparent coatings. Monodisperse is understood to mean particles exhibiting a dispersion index of at most 0.5, preferably of at most 0.3, the dispersion index being given by the following formula:

$$I = \frac{\emptyset_{84} - \emptyset_{16}}{2\emptyset_{50}}$$

in which:

$\emptyset_{84}$ is the diameter of the particles for which 84% of the particles have a diameter of less than $\emptyset_{84}$, $\emptyset_{16}$ is the diameter of the particles for which 16% of the particles have a diameter of less than $\emptyset_{16}$, $\emptyset_{50}$ is the mean diameter of the particles.

It can be advantageous, moreover, to deposit the coating, whatever the deposition technique envisaged, not in a single step but via at least two successive stages, which appears to promote the crystallization of the titanium dioxide throughout the thickness of the coating when a relatively thick coating is chosen.

Likewise, it can be advantageous to subject the coating, after having deposited it, to at least one heat treatment of the annealing type.

This heat treatment of the annealing type is in particular essential if the coating has been deposited by a technique of the sol-gel or laminar-coating type, according to the second method described above, in order to decompose the organometallic compound(s) to dioxide, once the coating of the substrate has been carried out.

In contrast, this heat treatment of the annealing type is not essential in the case where the coating is deposited by a pyrolysis technique, according to the first method described above, where the organometallic compound decomposes as soon as it comes into contact with the substrate. However, for the first as for the second method, a post-deposition heat treatment, once the titanium dioxide has been formed, improves the degree of crystallization and the adhesion. The treatment temperature chosen can, in addition, make it possible to exert better control over the degree of crystallization and the crystalline nature.

This annealing generally consists in introducing the substrate into an oven at a temperature of approximately 500 to 550° C. for a period of time which can range from 1 minute to 3 hours.

For both methods, a barrier layer to alkali metals can be useful between the substrate and the coating, very particularly if the coating has to be subjected to a relatively long and/or high-temperature heat treatment, because the migration of an excessively large amount of alkali metals originating from the glass under the effect of the heat into the coating can be harmful to the photocatalytic activity. This is also the case if the coating is chosen to be relatively thin, in particular when it exhibits a thickness of less than 20 nm.

Any type of titanium dioxide dispersion in which the particles exhibit the characteristics desired for the substrate, in particular as regards size and crystallinity, can be used, whether the liquid phase is aqueous or organic. However, an organic phase is preferred.

Finally, the invention relates to an organic dispersion comprising:

titanium dioxide particles with a size of between 5 and 70 nm which are monodisperse and predominantly in the anatase crystalline form, and at least one organic solvent, preferably exhibiting a latent heat of vaporization which is less than that of water.

The notion of monodispersity is the same as that defined above.

The titanium dioxide particles exhibit the same size and crystallinity characteristics as the particles of the coating of the substrate according to the invention described above.

Thus, the titanium dioxide particles of the dispersion exhibit a size of between 5 and 80 nm in general, preferably of between 5 and 70 nm, more preferably still of between 10 and 50 nm. The size is measured by TEM.

In addition, the nature of the crystalline phase of these titanium dioxide particles is preferably predominantly in the anatase crystalline form. "Predominantly" means that the level of anatase in the titanium dioxide particles of the dispersion according to the invention is greater than 50% by mass. Preferably, the particles of the dispersions used exhibit a level of anatase of greater than 80%.

For the liquid phase, preferably, the organic solvent exhibits a latent heat of vaporization which is less than that of water. Latent heat of vaporization is understood to mean the number of calories necessary to vaporize 1 g of liquid at the boiling temperature of the said liquid. The latent heat of vaporization of water at its boiling temperature is 540 cal/g (Handbook of Chemistry and Physics, 75th Ed.). Such an organic solvent can be chosen from alcohols (ethanol, isopropanol, and the like), in particular glycols (ethylene glycol), esters, such as ethyl acetate, and the like.

The level of titanium dioxide in the dispersion according to the invention can be between 1 g/l and 300 g/l.

These organic dispersions can comprise, depending on the type of process used to prepare it, a water content of at most 10% by weight, preferably of at most 5% and more preferably still of at most 1%.

The monodisperse particles of the dispersion generally result from a so-called solution or wet route preparation process (thermolysis, thermal hydrolysis or precipitation of a titanium salt), in contrast to processes for the high-temperature pyrolysis or oxidation of a titanium salt. They can be, for example, titanium dioxide particles obtained by the process described in Application EP-A-0,335,773.

It can in particular be the preparation process which consists of hydrolysing at least one titanium compound A in the presence of at least one compound B chosen from:

(i) acids which exhibit:
either a carboxyl group and at least two hydroxyl and/or amine groups,
or at least two carboxyl groups and at least one hydroxyl and/or amine group,
(ii) organic phosphoric acids of following formulae:

in which n and m are integers of between 1 and 6 and p is an integer of between 0 and 5, R1, R2 and R3, which are identical or different, representing a hydroxyl, amino, aralkyl, aryl or alkyl group or hydrogen, (iii) compounds capable of releasing sulphate ions in acidic medium,
(iv) salts of the acids described above, and in the presence of anatase titanium dioxide seeds exhibiting a size of at most 5 nm and in a ratio by weight of $TiO_2$ present in the seeds/titanium present before introduction of the seeds in the hydrolysis medium, expressed as $TiO_2$, of between 0.01% and 3%.

This process for the preparation of the particles thus comprises several stages and, firstly, a stage of preparation of the starting solution comprising a titanium compound A, a compound B as defined above and titanium dioxide seeds.

This starting solution, intended to be hydrolysed, is preferably completely aqueous; another solvent, for example an alcohol, can optionally be added, provided that the titanium compound A and the compound B used are then substantially soluble in this mixture.

As regards the titanium compound A, use is generally made of a compound chosen from halides, oxyhalides, titanium alkoxides, sulphates and more particularly synthetic sulphates.

Synthetic sulphates is understood to mean titanyl sulphate solutions produced by ion exchange from very pure titanium chloride solutions or by reaction of sulphuric acid with a titanium alkoxide.

The preparation is preferably carried out with titanium compounds of the titanium halide or oxyhalide type. The titanium halides or oxyhalides which are more particularly used in the present invention are titanium fluorides, chlorides, bromides and iodides (respectively oxyfluorides, oxychlorides, oxybromides and oxyiodides).

According to a particularly preferred form, the titanium compound is titanium oxychloride $TiOCl_2$.

The amount of titanium compound A present in the solution to be hydrolysed is not critical.

The initial solution additionally contains at least one compound B as defined above. Mention may be made, as non-limiting examples of compounds B coming within the scope of the present invention, of in particular:

hydroxypolycarboxylic acids and more particularly hydroxydi- or hydroxytricarboxylic acids, such as citric acid, maleic acid and tartaric acid, (polyhydroxy)monocarboxylic acids, such as, for example, glucoheptonic acid and gluconic acid, poly(hydroxy carboxylic) acids, such as, for example, tartaric acid, dicarboxylic amino acids and their corresponding amides, such as, for example, aspartic acid, asparagine and glutamic acid, hydroxylated or non-hydroxylated monocarboxylic amino acids, such as, for example, lysine, serine and threonine, aminotri(methylenephosphonate), ethylenediaminotetra (methylenephosphonate), triethylenetetraaminohexa (methylenephosphonate), tetraethylenepentaaminohepta(methylenephosphonate) or pentaethylenehexaaminoocta (methylenephosphonate), methylenediphosphonate, 1,1-ethylenediphosphonate, 1,2-ethylenediphosphonate, 1,1-propylenediphosphonate, 1,3-propylenediphosphonate, 1,6-hexamethylenediphosphonate, 2,4-dihydroxypentamethylene-2,4-diphosphonate, 2,5-dihydroxyhexamethylene-2,5-diphosphonate, 2,3-dihydroxybutylene-2,3-diphosphonate, 1-hydroxybenzyl-1,1-diphosphonate, 1-aminoethylene1,1-diphosphonate, hydroxymethylenediphosphonate, 1-hydroxyethylene-1,1-diphosphonate, 1-hydroxypropylene-1,1-diphosphonate, 1-hydroxybutylene-1,1-diphosphonate or 1-hydroxyhexamethylene-1,1-diphosphonate.

As already indicated, it is also possible to use, as compound B, all the salts of the abovementioned acids. In particular, these salts are either alkali metal salts, more particularly sodium salts, or ammonium salts.

These compounds can also be chosen from sulphuric acid and ammonium or potassium sulphates, and the like.

The compounds B as defined above are preferably hydrocarbon compounds of aliphatic type. In this case, the length of the main hydrocarbon chain preferably does not exceed 15 carbon atoms and more preferably 10 carbon atoms.

The amount of compound B is not critical. The molar concentration of the compound B with respect to that of the titanium compound A is generally between 0.2 and 10% and preferably between 1 and 5%.

Finally, the starting solution comprises titanium dioxide seeds used in a specific way.

Thus, the titanium dioxide seeds used in the present invention must first of all exhibit a size of less than 8 nm, measured by X-ray diffraction. Use is preferably made of titanium dioxide seeds exhibiting a size of between 3 and 5 nm.

Subsequently, the ratio by weight of the titanium dioxide present in the seeds to the titanium present in the hydrolysis medium before introduction of the seeds, that is to say contributed by the titanium compound A, and expressed as $TiO_2$ is between 0.01 and 3%. This ratio can preferably be between 0.05 and 1.5%. The bringing together of these two conditions with respect to the seeds (size and ratio by weight), in combination with the process as described above, makes it possible to precisely control the final size of the titanium dioxide particles, a level of seeds being associated with a particle size. It is thus possible to obtain particles for which the size varies between 5 and 100 nm.

Use is made of titanium dioxide seeds in the anatase form, so as to induce precipitation of the titanium dioxide in the anatase form. Generally, due to their small size, these seeds instead exist in the form of poorly crystallized anatase. The seeds are generally provided in the form of an aqueous suspension composed of titanium dioxide. They can generally be obtained in a known way by a process of neutralization of a titanium salt by a base.

The following stage consists in hydrolysing this starting solution by any means known to a person skilled in the art and generally by heating. In the latter case, the hydrolysis can preferably be carried out at a temperature greater than or equal to 70° C. It is also possible to operate, firstly, at a temperature below the boiling temperature of the medium and, then, to maintain the hydrolysis medium level at the boiling temperature.

Once hydrolysis has been carried out, the titanium dioxide particles obtained are recovered by separation of the precipitated solid from the mother liquors before being redispersed in an aqueous liquid medium so as to obtain a titanium dioxide dispersion. This liquid medium can be acidic or basic. It is preferably an acidic solution, for example an aqueous nitric or hydrochloric acid solution.

Any known process which makes it possible to suspend titanium dioxide particles in an organic phase from an aqueous titanium dioxide dispersion can be used in order subsequently to obtain an organic dispersion of these titanium dioxide particles.

The dispersion can thus be obtained by bringing an aqueous dispersion of titanium dioxide particles into contact with the desired organic solvent and by then heating, so as to remove the water by distillation. Such a process can only be employed in the case where the organic solvent chosen exhibits a boiling temperature greater than that of water and is soluble in water. This is the case, for example, with ethylene glycol.

The dispersion can also be obtained by grafting a hydrophobic chain to the surface of titanium dioxide particles in suspension in water and then by mixing with a water-immiscible organic solvent, so as to cause the titanium dioxide particles to migrate into the organic phase.

It has been observed that the titanium dioxide particles resulting from a so-called solution or wet-route preparation process, and in particular resulting from the process described above with hydrolysis at a temperature of approximately 100° C., exhibit, because of their porosity, a lower refractive index than the titanium dioxide particles resulting from other processes. As indicated above, this property is of great interest when these particles are used to prepare a coating on a substrate, very particularly a glass-based substrate, because the coating obtained also exhibits a low refractive index, as indicated above.

The liquid phase of the dispersion according to the invention advantageously comprises at least one organometallic compound based on a metal M chosen from titanium, silicon, tin, zirconium or aluminium. The preferred compounds correspond to the organometallic compounds described above.

When the liquid phase of the dispersion according to the invention also comprises an organometallic compound, the said compound is generally added by mixing a solution of the organometallic compound and a dispersion in organic phase of the titanium dioxide particles. It is also possible during this mixing, depending on the nature of the organometallic compound used, to add additives such as cosolvents, surfactants or stabilizing agents. The mixture can also be improved by agitation of the dispersion by ultrasound.

The solution of organometallic compound added to the organic dispersions based on titanium dioxide particles is generally a solution in organic phase, it being possible for the said organic phase to be chosen from: ethanol, isopropanol, ethyl acetate, and the like.

It is also possible to add the organometallic compounds to the titanium dioxide dispersions in the pure form.

These organometallic compounds can advantageously be stabilized by products such as diethanolamine (DEA), acetylacetone derivatives, such as ethyl acetoacetate, glycols, and the like.

The dispersion generally comprises 5 to 90% by weight of organometallic compounds, expressed as metal oxides $(MO_x)$, with respect to the weight of $TiO_2$ contributed by the particles and of organometallic compounds, expressed as metal oxides $(MO_x)$, preferably 15 to 80%, indeed from 20 to 75%.

As indicated above, in order to exaggerate the photocatalytic effect of the coating based on titanium dioxide, it is possible to add to the titanium dioxide, as indicated above, catalysts, additives which make it possible to achieve better absorption of U.V. radiation or to shift the absorption band towards the visible region, or alternatively metals which make it possible to dope the titanium dioxide in order, inter alia, to increase the number of electron carriers.

According to a first alternative form, at least a portion of the titanium dioxide particles of the dispersions comprise, in their crystal lattice, metal ions chosen from iron, copper, ruthenium, molybdenum, bismuth, tantalum, niobium, cobalt, nickel or vanadium. The ratio of the mass of these metal ions with respect to the mass of titanium dioxide can be between 0.01 and 10%. These dispersions can be obtained by introducing salts of the metal ions during the preparation of the titanium dioxide particles. Thus, if the titanium dioxide particles are obtained by thermal hydrolysis of a titanium compound, as is described in Application EP-A-0,335,773, it is possible to add metal ions to the thermal hydrolysis medium, so as to introduce the ions into the crystal lattice of the titanium dioxide.

According to a second alternative form, at least a portion of the titanium dioxide particles of the dispersions are at least partly covered by a layer of metal salts or oxides, the metal being chosen from iron, copper, ruthenium, cerium, molybdenum, bismuth, tantalum, niobium, cobalt, nickel, vanadium, tungsten, tin, zirconium, cadmium or zinc. The ratio of the mass of these metals with respect to the mass of the titanium dioxide can be between 0.01 and 20%. These dispersions can be obtained by precipitating metal salts on the titanium dioxide particles before placing in organic medium. Thus, when the titanium dioxide particles are still in aqueous medium following a wet-route preparation process, metal salts are introduced into the aqueous phase and are precipitated, so as to at least partly cover the titanium dioxide particles.

According to a third alternative form, at least a portion of the titanium dioxide particles of the dispersions are at least partly covered by a layer of metal chosen from platinum, silver or rhodium. The ratio of the mass of these metals with respect to the mass of titanium dioxide can be between 0.01 and 5%. These dispersions can be obtained by reducing metal salts on the titanium dioxide particles before placing in organic medium. For example, when the titanium dioxide particles are still in aqueous medium following a wet-route preparation process, metal salts are introduced into the aqueous phase and are reduced, so as to at least partly cover the titanium dioxide particles.

According to a fourth alternative form, the dispersions comprise, in addition to the titanium dioxide particles, additives in the form of particles based on metal compounds chosen from cerium, cadmium, tin, tungsten, zinc or zirconium. These particles are colloidal in size, generally between 5 and 100 nm. Their level in the dispersion can be between 0.1 and 20% by weight. As indicated above, the metal compounds can be metal oxides or sulphides, such as $CeO_2$, $SnO_2$, $WO_3$, $ZnO$, $ZrO_2$ or $CdSe_xS_y$, with x and y between 0 and 1 and x+y=1. The latter particles can be introduced into the dispersions by simple mixing with an aqueous dispersion of titanium dioxide particles resulting from a wet route and then by transfering all the particles of the aqueous phase into organic phase.

The dispersions according to the invention can exhibit the characteristics of the four alternative forms separately or simultaneously.

Finally, the invention relates to the use of an organic dispersion as described above in a process for the preparation of the substrate according to the invention.

Other advantageous characteristics and details of the invention emerge from the description hereinbelow of non-limiting implementational examples.

Figure 1:
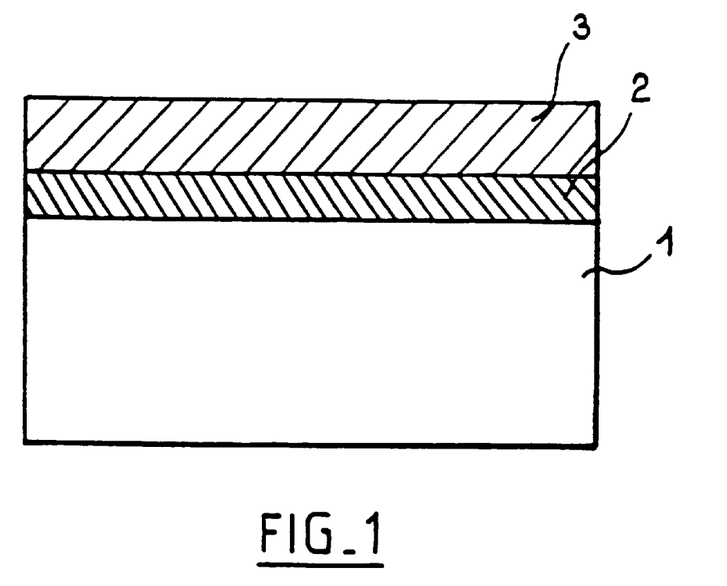
FIG. 1: cross-section of a substrate provided with the coating according to the invention.

As represented in an extremely diagrammatic way in FIG. 1, all the following examples relate to the deposition on a substrate (1) of a so-called "dirt-repellent" coating (3) essentially based on titanium dioxide.

EXAMPLES

Example 1
Preparation of an Organic Dispersion of Titanium Dioxide Particles

An aqueous dispersion of titanium dioxide particles is prepared according to the teaching of Patent Application EP-A-0,335,773 in the presence of seeds.
Hydrolysis The following are successively added to 394.7 g of a 1.9 mol/kg titanium oxychloride solution:

42.02 g of 36% hydrochloric acid, 4.73 g of citric acid, 547.1 g of purified water, 11.36 g (0.2% by weight with respect to $TiO_2$) of anatase seeds exhibiting a size of between 5 and 6 nm.

The mixture is brought to boiling point and is maintained there for 3 h.
Recovery of the Particles and Redispersing The solution is subsequently filtered and the particles obtained are washed with water until the chlorides have been completely removed. They are subsequently redispersed at pH 1.5 (controlled by the addition of $HNO_3$) with a solids content of 20% by weight.

An aqueous dispersion is obtained comprising particles with a diameter of 45 nm, measured by TEM. Analysis by X-ray diffraction shows that the particles are based on titanium dioxide solely in the anatase form at 80% by weight. The particles obtained are porous.
Dispersing in Organic Medium 100 parts by mass of this dispersion are mixed with 100 parts of ethylene glycol. The mixture is subsequently heated at 80° C., so as to remove the water by distillation carried out under reduced pressure (100 mbar), and then at 120° C., in order to remove the bonded water.

A dispersion of titanium dioxide particles in ethylene glycol is obtained. The solids content is 20% by weight. The size of the particles, measured in ethylene glycol by TEM, is 45 nm. The residual water content is 0.7% by weight with respect to the titanium dioxide.

Example 2
Preparation of an Organic Dispersion of Niobium-doped Titanium Dioxide Particles Example 1 is repeated, except that $NbCl_5$ is added to the hydrolysis medium in an amount such that the $Nb/TiO_2$ molar ratio is 0.1%.

Examples 3 to 7
Deposition of the Dispersions of Examples 1 and 2 by Pyrolysis

The substrate (1) is made of clear soda-lime-silica glass with a thickness of 6 mm and measuring 50 cm in length and width.

An optional thin layer (2) is found between the coating (3) and the substrate (1).

The following Examples 3 to 7 relate to a coating (3) deposited by a liquid-phase pyrolysis technique. Deposition can be carried out continuously, by using a suitable distribution nozzle arranged transversely and above the float glass strip, at the outlet of the float bath chamber proper. In this instance, the deposition was carried out in a noncontinuous way: the substrate (1), already cut to the dimensions indicated, is first heated in an oven to a temperature of 400 to 650° C., before progressing at a constant rate in front of a movable nozzle projecting an appropriate solution.

Example 3

In this example, there is no optional layer (2). The coating (3) is deposited using an organic dispersion A comprising:

a formulation comprising two organometallic titanium compounds and two solvents, according to the following proportions:

20% by weight of titanium diisopropoxydiacetylacetonate,

20% by weight of titanium tetraoctylene glycolate,

40% by weight of ethyl acetate,

20% by weight of isopropanol, the organic dispersion of titanium dioxide particles according to Example 1, diluted and exhibiting the following characteristics:

content by mass of particles: 10%, particles with a size of 45 nm, measured with a TEM, size of the crystallites: 5 nm crystalline phase: anatase greater than 80% liquid phase: ethylene glycol.

The formulation and the organic dispersion are in relative proportions such that the content of titanium dioxide particles in the dispersion A is adjusted so as to obtain a content of 25% by weight of titanium dioxide originating from the particles in the coating, once deposited (mass of $TiO_2$ resulting from the particles/total mass of the oxides in the coating, it being supposed that the decomposition of the organometallic compounds in the dispersion A to oxides is total).

As soon as the substrate (1) has reached the desired temperature in the oven, i.e. approximately 500° C., the latter progresses in front of the nozzle projecting the mixture indicated at room temperature using compressed air.

A titanium dioxide layer with a thickness of approximately 90 nm is then obtained, the thickness being controlled by the rate of progression of the substrate (1) in front of the nozzle and/or the temperature of the said substrate. The layer is partially crystallized in the anatase form.

This coating contains both titanium dioxide originating from the decomposition of the organometallics and from the titanium dioxide particles of the dispersion, the first acting, as it were, as inorganic binder with respect to the second. The layer exhibits excellent mechanical strength.

The refractive index is 2.3.

Example 4

Example 3 is repeated, except that the substrate (1) contains a thin layer (2) made of fluorine-doped tin oxide $SnO_2$:F, for the purpose of constituting a static and/or low-emissive layer and/or a layer which attenuates the colour, in particular in reflection.

This layer is obtained by powder pyrolysis from dibutyltin difluoride DBTF. It can also be obtained in a known way by liquid- or vapour-phase pyrolysis, as is described, for example, in Patent Application EP-A-0,648,196. It is possible, in vapour phase, in particular to use a mixture of monobutyltin trichloride and of a fluorinated precursor, optionally in combination with a "mild" oxidant of $H_2O$ type.

This thin layer exhibits a thickness of 73 nm, an index of 1.9 and a surface resistance of 50 ohms.square.

This substrate, treated in the same way as in Example 3 and assembled as a double glazing, so that the coating (3) is on face 1 (with another substrate which is non-coated but of the same nature and dimensions as the substrate (1)), via a 12 mm strip of air, exhibits a colour purity value in reflection (in the golden region) of 3.6% and of 1.1% in transmission.

The substrate of Example 3, assembled in the same way, exhibits a colour purity value in reflection (in the golden region) of 26% and of 6.8% in transmission.

The $SnO_2$:F sublayer has a favourable influence on the colorimetry of the substrate, making its colouring markedly more "neutral", both in transmission and in reflection, colouring caused by the presence of the titanium dioxide coating (3), exhibiting a relatively high refractive index. In addition, this sublayer decreases the diffusion of the alkali metals into the $TiO_2$ photocatalytic layer. The photocatalytic activity is thus improved. Despite the presence of a high amount of particles in the coating, the fuzziness is markedly lower than 1%. The fuzziness is defined by the ratio of the diffracted light transmission to the total light transmission of the substrate at 560 nm.

Example 5

Example 3 is repeated, except that the substrate (1) contains a thin layer (2) based on silicon oxycarbide for the purpose of constituting a barrier to the diffusion of alkali metals and/or a layer which attenuates light reflection.

This layer is obtained by CVD from a mixture of $SiH_4$ and of ethylene in dilution in nitrogen, as described in Patent Application EP-A-0,518,755. This layer is particularly efficient in preventing the tendency of alkali metals ($Na^+$, $K^+$) and alkaline earth metals ($Ca^{2+}$) originating from the substrate (1) to diffuse towards the coating (3).

This thin layer exhibits a thickness of 50 nm and an index of 1.75.

Having, like $SnO_2$:F, a refractive index intermediate between that of the base substrate (1) (1.52) and of the coating (3) (2.3), the layer also makes it possible to attenuate the intensity of the colouring of the substrate, both in transmission and in reflection, and to decrease overall the value of the light reflection $R_L$ of the said substrate.

Moreover, the sublayer based on silicon oxycarbide constitutes an efficient barrier to the diffusion of alkali metals and thus the photocatalytic activity of the coating is markedly improved.

Example 6

Example 3 is repeated, except that the coating (3) is deposited using a dispersion B comprising:
- a formulation based on silicon tetraethoxide $Si(OEt)_4$ diluted in ethanol at the rate of 0.1 mol per litre of ethanol,
- the organic dispersion of titanium dioxide particles of Example 1.

The formulation and the organic dispersion are in relative proportions such that the content of titanium dioxide particles in the dispersion B is adjusted so as to obtain a content of 80% by weight of titanium dioxide in the coating, once deposited (mass of $TiO_2$ originating from the particles/mass of $TiO_2$ of the particles+mass of the $SiO_2$ obtained by decomposition of $Si(OEt)4$, it being supposed that the decomposition is total).

As soon as the substrate (1) has reached the desired temperature in the oven, i.e. approximately 200° C., the latter progresses in front of the nozzle which projects the dispersion B at room temperature using compressed air.

A mixed layer of $TiO_2$ particles coming from the dispersion, bonded to one another and to the substrate by the $SiO_2$ originating from the decomposition of the organometallic, is then obtained. The coating has a thickness of approximately 50 nm and it is crystallized to 65% in anatase form.

The layer exhibits a high photocatalytic activity by virtue of the high specific surface developed by the $TiO_2$ particles (>250 $m^2/g$). Moreover, the $SiO_2$ binder acts as a barrier to alkali metals which is particularly efficient at the substrate/particle interface.

Finally, the refractive index is markedly lower than that of a bulk $TiO_2$ layer, by virtue of the presence of $SiO_2$ and of its high porosity. This index is less than 1.6. The value of the light reflection $R_L$ of the substrate is thus decreased.

Example 7

Example 6 is repeated, except that the dispersion B contains 0.1% niobium-doped titanium dioxide particles according to Example 2.

The layer exhibits an even higher photocatalytic activity.

Example 8

Deposition of the Dispersion of Example 1 by Dip Coating

This example uses the so-called sol-gel technique using a method of deposition by dip coating according to the principle which emerges from FIG. 2: it consists in immersing the substrate (1) in the liquid solution (4) containing the dispersion and then in extracting the substrate (1) therefrom at a controlled rate using a motor means (5), the choice of the extraction rate making it possible to adjust the thickness of the dispersion remaining at the surface of the two faces of the substrate and, in fact, the thickness of the coatings deposited, after heat treatment of the latter in order both to evaporate the solvent and to decompose the precursors of the metal oxides.

The coating (3) is deposited using a dispersion A or B as defined in Examples 3, 6 or 7. Use is also made of an organic dispersion C comprising:

a formulation based on titanium tetrabutoxide Ti(O—Bu)$_4$ stabilized with diethanolamine DEA in a molar proportion 1:1 and diluted in ethanol at the rate of 0.2 mol of tetrabutoxide per litre of ethanol.

a dispersion of titanium dioxide particles according to Example 1 exhibiting the following characteristics:

content by mass of particles: 10%, particles with a size of 45 nm, measured with a TEM, size of the crystallites: 5 nm, crystalline phase: anatase greater than 80%, liquid phase: ethylene glycol.

The formulation and the organic dispersion are in relative proportions such that the content of titanium dioxide particles in the dispersion C is adjusted so as to obtain a content of 80% by weight of titanium dioxide originating from the particles in the coating, once deposited (mass of $TiO_2$ resulting from the particles/total mass of the oxides in the coating, it being supposed that the decomposition of the organometallic compounds in the dispersion C to oxides is total).

After dip coating the substrates (1) containing thin layers (2) based on silicon oxycarbide in the dispersions A, B or C, the substrates (1) are heated for 3 hours at 550° C. with a gradual rise in temperature.

In the three cases, a coating (3) of well-crystallized titanium dioxide in the anatase form is obtained on each of the faces. The anatase degrees of crystallization are comparable with the examples using a pyrolysis deposition technique but the size of the crystallites is greater by virtue of the prolonged heat treatment. This results in a better photocatalytic activity.

The coating has a refractive index of at most 1.8.

Example 9
Deposition of the Dispersion of Example 1 by Cell Coating

This example uses the technique known as cell coating, the principle of which emerges from FIG. 3: it consists in forming a narrow cavity delimited by two substantially parallel faces (6), (7) and two seals (8), (9), at least one of these faces (6), (7) being composed of the face of the substrate (1) to be treated. The cavity is then filled with the dispersion (4) in a controlled way, so as to form a wetting meniscus, for example using a peristaltic pump (10), a film of the dispersion (4) being left on the face of the substrate (1) as the solution is removed.

The cavity is subsequently maintained for at least the time necessary for drying. The curing of the film on the substrate is provided by heat treatment, as in the preceding examples.

The coating (3) is deposited using solutions A, B or C described in Examples 3, 6 and 8.

After dip coating the substrate (1) containing thin layers (2) based on silicon oxycarbide in the dispersions A, B or C, the same heat treatments as in Example 8 are carried out.

In the three cases, a coating (3) comparable with the coatings of Example 8 is obtained but, in this instance, only one face of each substrate is treated.

Example 10
Control of the Properties of the Substrates Obtained

Test 1 of wetting

It consists in depositing a layer of an organosilane on the substrate to be evaluated and in irradiating with U.V.A. radiation, so as to degrade the layer by photocatalysis. As the organosilane modifies the wetting properties, measurements of contact angle of the substrate with water during the irradiation indicate the state of degradation of the grafted layer. The rate of disappearance of this layer is related to the photocatalytic activity of the substrate.

The grafted organosilane is a trichlorosilane: octadecyl-trichlorosilane (OTS). The grafting is carried out by dip coating.

The test device is composed of a carousel rotating around from 1 to 6 low pressure U.V.A. lamps. The test specimens to be evaluated are placed in the carousel, the face to be evaluated on the side of the U.V.A. radiation. Depending on their position and the number of lamps switched on, each test specimen receives U.V.A. radiation varying from 0.5 $W/m^2$ to 50 $W/m^2$.

The time between each measurement of the contact angle varies between 20 min and 3 h, depending on the photocatalytic activity of the test specimen under consideration. The measurements are carried out using a goniometer.

Before irradiation, the glass specimens exhibit an angle of approximately 100°. It is considered that the layer is destroyed after irradiation when the angle is less than 20°.

Each test specimen tested is characterized by the mean rate of disappearance of the layer, given in nanometres per hour, i.e. the thickness of the organosilane layer deposited, divided by the irradiation time which allows a final level of less than 20° to be achieved (time for disappearance of the organosilane layer).

Test 2 of isobutane:

It consists in controlling the degradation of the gas isobutane brought into contact with a glass treated according to the invention.

The glass to be tested and an amount of isobutane equal to 20% of the total volume of the reactor are introduced into the reactor.

The test device is composed of a carousel rotating around from 1 to 6 low pressure U.V.A. lamps exhibiting an emission maximum between 300 and 400 nm. The reactors containing the glass specimens to be evaluated are placed in the carousel, the face of the glass to be evaluated on the side of the U.V.A. radiation. Depending on their position and the number of lamps switched on, each glass receives U.V.A. irradiation ranging up to 30 $W/m^2$.

The irradiation lasts 8 to 22 h.

The progress of the photodecomposition of the isobutane is subsequently assayed, using a gas chromatograph, by monitoring the amount of $O_2$. This progress is expressed using the rate constant for disappearance of the $O_2$ in $mol/h/cm^2$.

Test 3 of palmitic acid

It consists in depositing a layer of palmitic acid on the substrate to be evaluated and in irradiating it with U.V.A. radiation, so as to degrade it by photocatalysis.

An 8 g/l solution of palmitic acid in chloroform is sprayed onto the glass specimens to be tested. The amount of palmitic acid deposited per 30 $cm^2$ of glass is 1.5 mg. The glass specimens are then introduced into a leaktight reactor surrounded by six UV lamps exhibiting an emission maximum between 300 and 400 nm. The glass specimens to be tested, thus irradiated, receive a power of 10 W/m$^2$. The irradiation lasts at most 40 h.

The glass specimens are subsequently removed from the reactor. In order to assay the palmitic acid remaining on the glass specimens, the latter are washed with a solution of acid in chloroform; the solution obtained is then assayed by liquid chromatography in order to assay the remaining palmitic acid.

The time for the complete degradation of 1.5 mg of palmitic acid, expressed in minutes, is thus given.

The degradation of the palmitic acid can also be observed visually by the decrease in the fuzziness of the glass induced by the layer of palmitic acid.

Test 4 of anti-condensation:

It consists in observing the consequences of the photocatalysis and of the structure of the coating (level of hydroxyl groups, porosity, roughness) on the wetting. If the surface is photoreactive, the carbonaceous microcontaminations which are deposited on the coating are continuously destroyed and the surface is hydrophilic and thus anti-condensation. It is also possible to carry out a quantitative evaluation by suddenly reheating the coated substrate, initially stored under cold conditions, or simply by blowing over the substrate, by looking to see if condensation appears and, if so, when, and by then measuring the time necessary for the disappearance of the said condensation.

Test 5 of the contact angles:

It consists in evaluating the hydrophilicity and the oleophilicity at the surface of the coating (3), in comparison with those of the surface of a bare glass, by measuring contact angles of a drop of water and of a drop of DOP (dioctyl phthalate) at their surfaces. The measurement is carried out after having left the substrates for a week exposed to the surrounding atmosphere under natural lighting, in the dark, and then having subjected them for 20 min to UVA radiation.

Results of the photocatalytic tests:

| Substrate | Wetting test at 1.8 W/m$^2$ UVA (in nm/h) | Isobutane test 30 W/m$^2$ UVA (in mol O$_2$/h/cm$^2$) | Palmitic acid test 10 W/m$^2$ UVA (in min) |
|---|---|---|---|
| Example 3 | 0.1 | $10^{-8}$ | >1000 |
| Example 4 | 0.3 | $2 \times 10^{-8}$ | >1000 |
| Example 5 | 3 | $10^{-7}$ | 800 |
| Example 6 | 4 | $10^{-7}$ | 730 |
| Example 7 | 6 | $10^{-7}$ | 620 |
| Examples 8 and 9 | | | |
| Dispersion A | 5 | $10^{-7}$ | 660 |
| Dispersion B | 10 | $2 \times 10^{-7}$ | 390 |
| Dispersion C | 20 | $5 \times 10^{-7}$ | 250 |

Test 4 results: for all the substrates of Examples 3 to 9, there is no appearance of condensation.

Test 5 results: for all the substrates of Examples 3 to 9, the contact angle with water and with DOP is less than 50 after exposure for 20 min to UVA radiation.

We claim:

1. A substrate provided, on at least a portion of one of its faces, with a coating with a photocatalytic property based on titanium dioxide which is at least partially crystalline and which is incorporated in said coating partly in the form of particles predominantly crystallized in the anatase form, said particles being incorporated in the coating using an inorganic binder, and wherein at least one thin layer with an anti-static, thermal or optical function or forming a barrier to the migration of alkali metals originating from the substrate, is arranged under the coating based on titanium dioxide.

2. A substrate according to claim 1, wherein the size of particles is between 5 and 80 nm.

3. A substrate according to claim 1, wherein the binder is in the form of an amorphous or partially crystalline oxide or mixture of oxides selected from the group consisting of silicon oxide, titanium oxide, tin oxide, zirconium oxide and aluminum oxide.

4. A substrate according to claim 3, wherein the coating exhibits a refractive index of between 1.40 and 2.35.

5. A substrate according to claim 4, wherein the coating exhibits a refractive index of between 1.6 and 2.3.

6. A substrate according to claim 1, wherein the binder is at least partly organic.

7. A substrate according to claim 1, wherein at least a portion of the titanium dioxide particles comprise, in their crystal lattice, metal ions selected from the group consisting of iron, copper, ruthenium, cerium, molybdenum, bismuth, tantalum, nickel, and vanadium.

8. A substrate according to claim 1, wherein at least a portion of the titanium dioxide particles are covered at least in part by a layer of metal oxides or salts, the metal being selected from the group consisting of iron, copper, ruthenium, cerium, molybdenum, bismuth, tantalum, cobalt, nickel, vanadium, tungsten, tin, zirconium, cadmium, and zinc.

9. A substrate according to claim 8, wherein at least a portion of the titanium dioxide particles are covered at least partly by a layer of metal selected from the group consisting of platinum, silver and rhodium.

10. A substrate according to claim 1, wherein the coating comprises additive particles based on cadmium, tin, tungsten, zinc, cerium or zirconium.

11. A substrate according to claim 1, wherein the thickness of the coating is between 5 nm and 1 micron.

12. A substrate according to claim 11, wherein the thickness of the coating is between 5 mn and 100 nm.

13. A substrate according to claim 1, wherein said substrate is based on glass, ceramic or vitroceramic.

14. A substrate according to claim 1, wherein the thin layer is a conductive material which is a metal or doped metal oxide.

15. A substrate according to claim 14, wherein the thin layer is a doped metal oxide selected from the group consisting of indium oxide doped with tin ITO, tin oxide doped with fluorine SnO$_2$:F, zinc oxide doped with indium ZnO:In, zinc oxide doped with fluorine ZnO:F, zinc oxide doped with aluminum ZnO:Al, and zinc oxide doped with tin ZnO:Sn.

16. A substrate according to claim 14, wherein the coating constitutes the final layer of a stack of anti-glare layers.

17. A monolithic glazing or multiple glazing of the double glazing or laminated type incorporating a substrate according to claim 1.

18. A process for producing a substrate provided, on at least a portion of one of its faces, with a coating with a photocatalytic property based on titanium dioxide which is at least partially crystalline and which is incorporated in said coating partly in the form of particles predominantly crystallized in the anatase form, said particles being incorporated in the coating using an inorganic binder, comprising the step of depositing and heat treating the coating, from a dispersion comprising at least one organometallic compound and titanium dioxide particles, said particles being predominantly crystallized in the anatase form.

19. A process for producing a substrate according to claim 18, wherein the coating is deposited by a sol-gel technique, with a method of deposition of dip-coating, cell-coating, lamninar-coating or spray-coating, from a dispersion comprising at least one organometallic compound and titanium dioxide particles, said particles being predominantly crystallized in the anatase form.

20. A process according to claim 19, wherein the dispersion has a ratio of the mass of the organometallic compounds, expressed as metal oxides ($MO_x$), with respect to the weight of $TiO_2$ contributed by the particles and of the organometallic compounds, expressed as metal oxides ($MO_x$), between 5 and 80%.

21. A process according to claim 19, wherein the organometallic compounds are based on titanium or on silicon.

22. A process according to claim 19, comprising the step of depositing the coating in at least two successive stages.

23. A process according to claim 22, comprising the step of subjecting the coating, after deposition, to at least one heat treatment.

24. A process for producing a substrate provided, on at least a portion of one of its faces, with a coating with a photocatalytic property based on titanium dioxide which is at least partially crystalline and which is incorporated in said coating partly in the form of particles predominantly crystallized in the anatase form, said particles being incorporated in the coating using an inorganic binder, comprising the step of depositing the coating by liquid phase pyrolysis, from a dispersion comprising one or more organometallic compounds and titanium dioxide particles, said particles being predominantly crystallized in the anatase form.

25. A process according to claim 24, wherein the dispersion has a ratio of the mass of the organometallic compounds, expressed as metal oxides ($MO_x$), with respect to the weight of $TiO_2$ contributed by the particles and of the organometallic compounds, expressed as metal oxides ($MO_x$), between 5 and 80%.

26. A process according to claim 24, wherein the organometallic compounds are based on titanium or on silicon.

27. An organic dispersion, comprising:
 titanium dioxide particles with a size of between 5 and 80 nm which are monodisperse and predominantly in the anatase crystalline form,
 at least one organometallic compound, and
 at least one organic solvent.

28. An organic dispersion according to claim 27, wherein the organic solvent exhibits a latent heat of vaporization which is less than that of water.

29. A dispersion according to claim 27, wherein the organic solvent is an alcohol or an ester.

30. A dispersion according to claim 27, wherein the titanium dioxide particles result from a solution preparation process.

31. A dispersion according to claim 30, wherein the titanium dioxide particles are prepared by hydrolysing at least one titanium compound A in the presence of at least one compound B selected from the group consisting of:
 (i) acids which exhibit:
  either a carboxyl group and at least two hydroxyl and/or amine groups,
  or at least two carboxyl groups and at least one hydroxyl and/or amine group,
 (ii) organic phosphoric acids of following formulae:

in which n and m are integers of between 1 and 6 and p is an integer of between 0 and 5, R1, R2 and R3, which are identical or different, representing a hydroxyl, amino, aralkyl, aryl or alkyl group or hydrogen,
 (iii) compounds capable of releasing sulphate ions in acidic medium, and
 (iv) salts of the acids described above, in the presence of anatase titanium dioxide seeds exhibiting a size of at most 5 nm and in a ratio by weight of $TiO_2$ present in the seeds/titanium present before introduction of the seeds in the hydrolysis medium, expressed as $TiO_2$, of between 0.01% and 3%.

32. A dispersion according to claim 30, wherein the particles are porous.

33. A dispersion according to claim 27, further comprising at least one organometallic compound whose metal is titanium, silicon, tin, zirconium or aluminum.

34. A dispersion according to claim 33, wherein the organometallic compound is a compound of general formula $M(OR)_4$ in which M is titanium, silicon, tin, zirconium or aluminum and R an alkyl, cycloalkyl, aryl, alkylaryl or arylalkyl, alkenyl or alkynyl group, an acetylacetonate group, an amino group, or a glycolate.

35. A dispersion according to claim 27, wherein the proportion of the organometallic compounds is such that the ratio of the mass of these organometallic compounds, expressed as metal oxides ($MO_x$), with respect to the weight of $TiO_2$ contributed by the particles and of the organometallic compounds, expressed as metal oxides ($MO_x$), is between 5 and 80%.

36. A dispersion according to claim 27, comprising additive particles based on metal compounds whose metal is cadmium, tin, tungsten, zinc, cerium or zirconium.

37. A dispersion according to claim 27, wherein at least a portion of the titanium dioxide particles of the dispersion is doped in their crystal lattice by metal ions whose metal is iron, copper, ruthenium, cerium, molybdenum, bismuth, tantalum, cobalt, nickel or vanadium.

38. A dispersion according to claim 27, wherein at least a portion of the titanium dioxide particles of the dispersion are at least partly covered by a layer of metal oxides or salts, whose metal is iron, copper, ruthenium, cerium, molybdenum, bismuth, tantalum, cobalt, nickel, vanadium, tungsten, tin, zirconium, cadmium or zinc.

39. A dispersion according to claim 27, wherein at least a portion of the titanium dioxide particles of the dispersion is at least partly covered by a catalyst.

40. A dispersion according to claim 39, wherein said catalyst is platinum, silver or rhodium.

* * * * *